United States Patent [19]

Okamura

[11] 4,227,304
[45] Oct. 14, 1980

[54] DEVICE FOR REMOVAL OF ICE FIXED TO ROD OF CONTROL CABLE

[75] Inventor: Koshiro Okamura, Takarazuka, Japan

[73] Assignee: Nippon Cable System Inc., Hyogo, Japan

[21] Appl. No.: 954,247

[22] Filed: Oct. 24, 1978

[51] Int. Cl.³ .............................................. B08D 11/00
[52] U.S. Cl. ..................................... 30/169; 15/256.6
[58] Field of Search ................ 15/246, 250.24, 256.29, 15/256.6; 30/168, 169, 296 R

[56] References Cited
U.S. PATENT DOCUMENTS 2,646,581  7/1953  Nelson ................................ 30/169 X
3,231,972  1/1966  Annese .................................. 30/168

Primary Examiner—Jimmy C. Peters
Attorney, Agent, or Firm—Armstrong, Nikaido, Marmelstein & Kubovcik

[57] ABSTRACT

A device for the removal of ice fixed to a rod of a control cable, which comprises a tubular fitting having at its opening a deicing surface including at least one sharp-pointed portion and inclined with respect to the axis of the rod, the tubular fitting being secured onto the end of a guide pipe in which the rod connected to an inner cable is slidably disposed. The device can remove the ice automatically with a small operational power by operating the inner cable.

4 Claims, 6 Drawing Figures

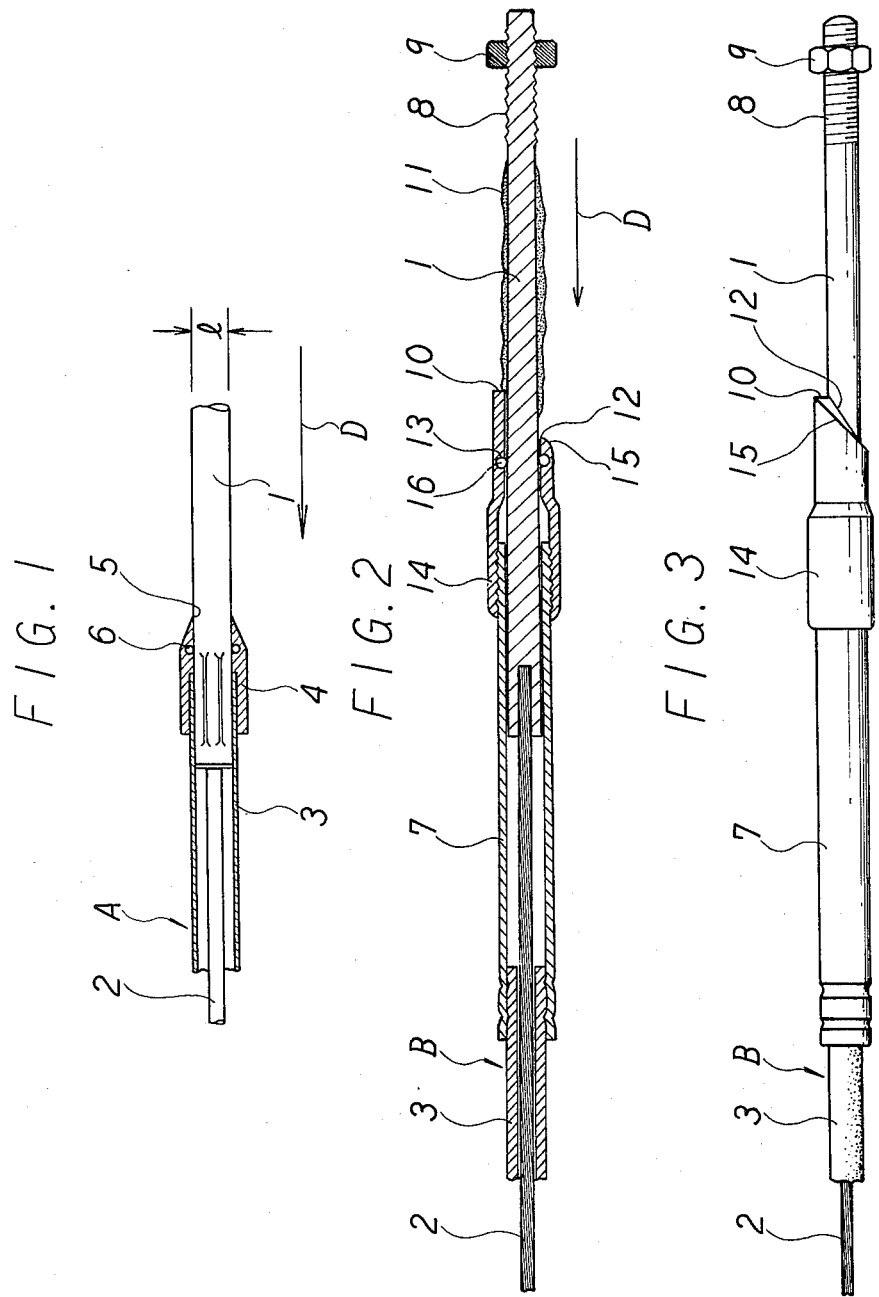

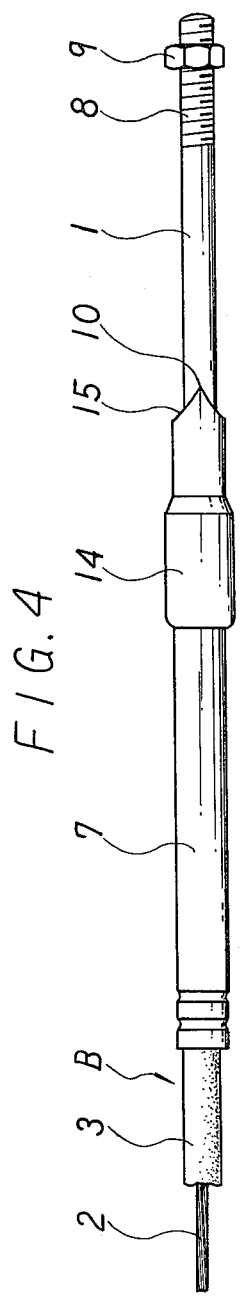
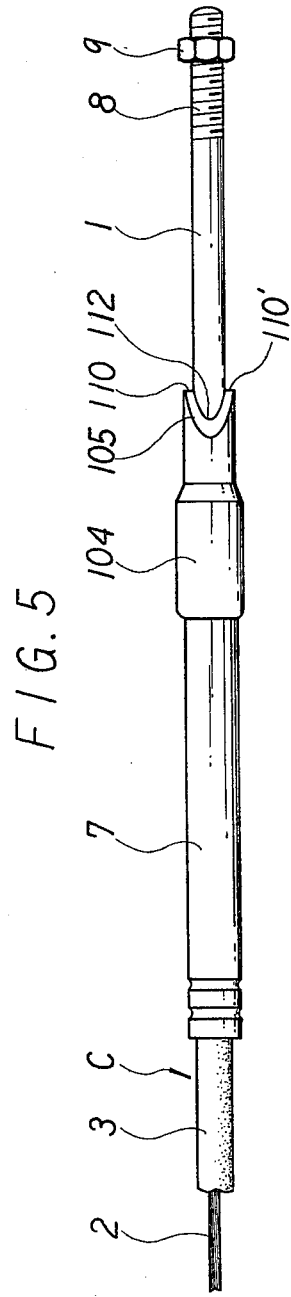
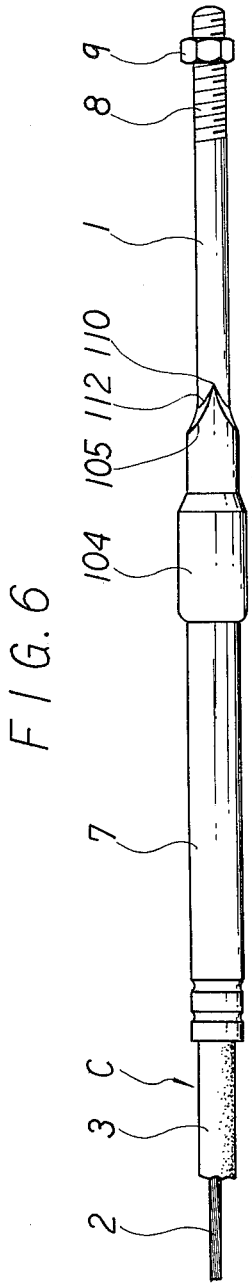

DEVICE FOR REMOVAL OF ICE FIXED TO ROD OF CONTROL CABLE

BACKGROUND OF THE INVENTION

The present invention relates to a device for the removal of ice fixed to a rod of a control cable which is used for remote control of various mechanisms.

In control cables as are known in the art, a rod is often covered with ice in winter since the rod is bared to the outside from a guide pipe secured to the end of a conduit. As a result, the rod cannot slide within a guide pipe even when operating an inner cable. The control cables have no device for the removal of the ice. Therefore, the ice fixed to the rod has been removed by breaking or heating in order to slide the rod. However, it is very difficult to remove the ice by such ways since in general the rod is located in the position which is beyond the reach of one's hand.

In order to eliminate this disadvantage, there have been proposed several devices for the removal of ice fixed to a rod of a control cable. One of the previous proposals, as disclosed in the Japanese Utility Model Publication No. 11875/1975 and shown in FIG. 1, comprises a tubular fittings 4 having a sharp-edged portion 5 making an acute angle with the axis of a rod 1 and provided at an inner surface thereof with an O-ring 6. The device can remove ice fixed to the rod 1 of a control cable A by operating an inner cable 2 and also prevent submersion under water from the clearance between the rod 1 and the fittings 4. However, the device has disadvantage that a properly great operational power is required to operate the inner cable 2 in order to remove the ice since the sharp-edged portion 5 enters between the ice and the rod 1 and therefore the sharp-edged portion 5 is apt to chip easily.

OBJECTS OF THE INVENTION

It is an object of the present invention to provide a device for the removal of ice fixed to a rod of a control cable which can remove the ice automatically with a small operational power by operating the control cable.

Another object of the invention is to provide a device for the removal of ice fixed to a rod of a control cable having at least one sharp-pointed portion which is so constructed as not to chip easily.

Still another object of the invention is to provide a device for the removal of ice fixed to a rod of a control cable in which a water-proof member for preventing the rod from forming rust is engaged in an inner surface thereof.

Other objects of the invention will become apparent from the following description given with reference to the accompanying drawings.

BRIEF DESCRIPTION OF THE DRAWINGS

FIG. 1 is a longitudinal sectional view showing a conventional device for the removal of ice fixed to a rod of a control cable;

FIG. 2 is a longitudinal sectional view of a embodiment of the present invention in which a rod of a control cable is covered with ice;

FIG. 3 is a front view of the embodiment shown in FIG. 2;

FIG. 4 is a plan view of the embodiment shown in FIG. 2;

FIG. 5 is a front view of another embodiment of the invention; and

FIG. 6 is a plan view of the embodiment shown in FIG. 5.

DETAILED DESCRIPTION

In the drawings, same reference characters designate same or corresponding parts throughout.

Referring now to FIGS. 2 to 4, a rod 1 is connected at one end thereof to an inner cable 2 of a control cable B and is formed at other end thereof with the thread of a screw 8 including a nut 9 in order to connect the control cable B to various equipments.

The rod 1 is moved slidably within a guide pipe 7 by operating the inner cable 2. The guide pipe 7 is provided at one end thereof with a fitting 14 for the removal of the ice 11 and is secured at other end thereof to the conduit 3 in which the inner cable 2 moves slidably.

The fitting 14 is in a form of a tube and preferably the diameter thereof is as small as possible within the permissible range that the rod 1 can slide therein. Further, the fitting 14 is formed at its opening a deicing surface 15 having a sharp-pointed portion 10 and inclined at an acute angle with respect to the axis of the rod 1 as shown in FIGS. 3 and 4. The sharp-pointed portion 10 so constructed as shown in FIGS. 2 to 4 has strength enough to break the ice 11 easily with a small operational power.

In FIGS. 2 and 3, a ridgeline 12 of the deicing surface 15 which is in slidable contact with the rod 1 preferably is in the form of a blade making an acute angle with the axis of the rod 1 in order to peel off the ice 11.

According to the embodiment shown in FIGS. 2 to 4, the operation and advantages of the device of the present invention will be described below. When the rod 1 is moved to the direction of D by operating the inner cable 2, the ice 11 fixed to the rod 1 is broken by the sharp-pointed portion 10 into halves and then peels out of the rod 1. Even when a part of the ice 11 remains to the rod 1, the deicing surface 15 removes the remained ice perfectly.

Thus, the removal of the ice 11 fixed to the rod 1 is conducted by operating the inner cable 2 with a usual operational power.

Referring to FIGS. 5 and 6, a fitting 104 unlike the embodiment shown in FIGS. 2 to 4 is formed at its opening a deicing surface 105 having two sharp-pointed portions 110, 110'. The structure of this embodiment can remove ice fixed to a rod 1 of a control cable C automatically on both upper and lower sides of the rod 1 with a smaller operational power.

The fitting 104 having the shape shown in FIGS. 5 and 6 breaks the ice by two sharp-pointed portions 110, 110' and peels off the broken ice from the rod 1. Even when a part of the ice remains on the rod 1, the part is removed perfectly by a ridgeline 112 of the deicing surface 105. This embodiment shown in FIGS. 5 and 6 is more suitable for a relatively thick rod. That is, when the ice is broken by a sharp-pointed portion, two sharp-pointed portions retain less of the broken ice which does not peel out of the rod than one sharp-pointed portion. Also, the ice is removed with so much small operational power by operating the inner cable 2.

Further, there may be formed at a suitable position of an inner surface of a fitting with an annular groove in which a water-proof member such as an O-ring 16 is engaged (shown in FIG. 2), thereby preventing submersion under water from the clearance between the rod and the fitting. This structure can serve to protect the inner surface of the control cable from rust.

According to the present invention, the tubular fitting is made of metal such as iron. Also, the water-proof member is made of synthetic resin such as polyacetals, polycarbonates or polyamides.

As above-mentioned, the device of the present invention can remove the ice fixed to the rod by substantially the same operational power as usual for operating the inner cable.

Also, it is to be understood that the invention is not limited to the exact material of the embodiments shown and described herein, as obvious modifications and equivalents will be apparent to those skilled in the art, and the invention therefore is to be limited only by the scope of the appended claims.

What is claimed is:

1. A device for the removal of ice fixed to a rod of a control cable, which comprises a tubular fitting having at its opening a deicing surface including at least one sharp-pointed portion and inclined at an acute angle with respect to the axis of the rod, and a rigid guide pipe, the fitting being secured onto the end thereof in which the rod connected to an inner cable of the control cable is slidably disposed.

2. The device of claim 1, wherein there is formed at an inner surface of the fitting with an annular groove in which a water-proof member is engaged, thereby preventing submersion under water from the clearance between the rod and the fittings.

3. The device of claim 1, wherein the fitting is made of metal.

4. The device of claim 2, wherein the water-proof member is an O-ring made of synthetic resin.